United States Patent
Lee et al.

(10) Patent No.: US 8,821,720 B2
(45) Date of Patent: Sep. 2, 2014

(54) FILTERING APPARATUS FOR TREATING BALLAST WATER

(75) Inventors: Soo-Tae Lee, Busan (KR); Tae-Sung Pyo, Busan (KR); Su-Kyu Lee, Busan (KR)

(73) Assignee: Panasia Co., Ltd., Busan (KR)

( * ) Notice: Subject to any disclaimer, the term of this patent is extended or adjusted under 35 U.S.C. 154(b) by 763 days.

(21) Appl. No.: 13/001,552

(22) PCT Filed: Jun. 18, 2010

(86) PCT No.: PCT/KR2010/003967
§ 371 (c)(1),
(2), (4) Date: Apr. 13, 2011

(87) PCT Pub. No.: WO2011/155654
PCT Pub. Date: Dec. 15, 2011

(65) Prior Publication Data
US 2011/0303591 A1    Dec. 15, 2011

(30) Foreign Application Priority Data
Jun. 11, 2010    (KR) .................. 10-2010-0055636

(51) Int. Cl.
*B01D 29/68*    (2006.01)
*B01D 29/11*    (2006.01)
*B63J 4/00*    (2006.01)
*B01D 29/00*    (2006.01)
*B01D 29/64*    (2006.01)

(52) U.S. Cl.
CPC .......... *B01D 29/688* (2013.01); *B01D 29/0077* (2013.01); *B01D 2201/301* (2013.01); *B01D 2201/082* (2013.01); *B01D 29/117* (2013.01); *B63J 4/002* (2013.01); *B01D 2201/302* (2013.01); *B01D 29/6461* (2013.01); *B01D 29/684* (2013.01)
USPC ....... 210/107; 210/170.11; 210/108; 210/414

(58) Field of Classification Search
CPC .................. B01D 29/688; B01D 2201/082
See application file for complete search history.

(56) References Cited

U.S. PATENT DOCUMENTS 2,835,390 A * 5/1958 King .............................. 210/411
5,364,539 A * 11/1994 Castagno et al. ............. 210/768
(Continued)

FOREIGN PATENT DOCUMENTS

| CN | 101014397 A | 8/2007 |
|---|---|---|
| JP | 2004-358405 | 12/2004 |

(Continued)

OTHER PUBLICATIONS

International Search Report issued Jul. 27, 2011 in PCT Application No. PCT/KR2010/003967, filed Jun. 18, 2010.

*Primary Examiner* — Terry Cecil
(74) *Attorney, Agent, or Firm* — Workman Nydegger

(57) ABSTRACT

Disclosed herein is a filtering apparatus for treating ballast water. The apparatus is constructed so that a housing cover plate and an exhaust unit are removably coupled to each other at an upper position of a housing. The exhaust unit includes a base flange on a portion thereof coupled to the housing cover plate and the base flange includes a projecting step that projects to be inserted into a core through hole formed in the housing cover plate. A core serving as a discharge passage of foreign substances includes a shaft coupling unit on a portion thereof coupled to the driving shaft, and is coupled at the shaft coupling unit to the driving shaft via a coupling structure. The outer diameters of the coupling structure and the shaft coupling unit are formed to be smaller than the outer diameter of the core.

9 Claims, 12 Drawing Sheets

(56) References Cited

U.S. PATENT DOCUMENTS

2008/0017591 A1 1/2008 Ranade et al.
2008/0067119 A1 3/2008 Wnuk et al.

FOREIGN PATENT DOCUMENTS

| | | |
|---|---|---|
| JP | 2008-507391 | 3/2008 |
| KR | 2002-0080696 | 10/2002 |
| KR | 10-0530806 | 11/2005 |
| KR | 10-2009-0038571 | 4/2009 |
| KR | 10-2009-0087703 A | 8/2009 |
| KR | 10-2010-0057224 A | 5/2010 |
| WO | 2007/108012 A2 | 9/2007 |
| WO | 2010/062032 A2 | 6/2010 |

* cited by examiner

PRIOR ART

PRIOR ART

PRIOR ART

PRIOR ART

FILTERING APPARATUS FOR TREATING BALLAST WATER

TECHNICAL FIELD

The present invention relates, in general, to a filtering apparatus for treating ballast water and, more particularly, to a filtering apparatus for treating ballast water, in which a housing cover plate and an exhaust unit are removably coupled to each other at an upper position of a housing, thus facilitating the assembly, disassembly, and maintenance of the filtering apparatus, and in which the exhaust unit includes a base flange on a portion thereof coupled to the housing cover plate and the base flange includes a projecting step that projects to be inserted into a core through hole formed in the housing cover plate, thus allowing the exhaust unit to be precisely and easily coupled to the housing cover plate using the core through hole formed in the housing cover plate, and in which a core serving as a discharge passage of foreign substances includes a shaft coupling unit on a portion thereof coupled to the driving shaft, and is coupled at the shaft coupling unit to the driving shaft via a coupling means, and the outer diameters of the coupling means and the shaft coupling unit are formed to be smaller than the outer diameter of the core, thus permitting the easy assembly or disassembly of the exhaust unit or the housing cover plate, and which prevents the coupling means from being broken or removed even in spite of frequent rotations or vertical movements, and which enables the driving shaft and the core to be easily pulled out from the housing even though there is a spatial limitation, and which prevents non-filtered ballast water, present inside a filter, from flowing into a suction nozzle and being discharged through the exhaust unit.

BACKGROUND ART

Ballast water is the seawater that is put into a ballast tank of a ship in order for the ship to maintain its balance while sailing without goods.

The increasing volume of internal trade has led to an increase in the ratio of marine transportation, so that the numbers and sizes of the ships also have been increasing rapidly. Thus, the volume of ballast water used in ships has also increased considerably. As the volume of the ballast water used in the ship has increased, the damage done to the endemic marine ecosystem resulting from it being attacked by exotic marine organism species is also increasing. In order to address the international environmental contamination problem, the Internal Maritime Organization (IMO) completed the 'International treaty concerning control and management of ballast water and sediment of ships' in 2004, which became effective in 2009.

As a conventional method of treating ballast water, methods of exchanging ballast water while on the sea or land treatment methods were used but are ineffective. Thus, methods whereby a ballast water treatment system is installed in a ship have been widely used. Particularly, the ballast water treatment system mainly uses a filtering method using a filter.

FIG. 1 is a sectional view showing a conventional ballast water filtering apparatus, FIG. 2 is a view showing the process of coupling an upper portion of a housing to a housing body, in the apparatus of FIG. 1, FIG. 3 is a view showing a coupling relation between a core and a driving shaft of FIG. 1, and FIG. 4 is a view showing the process of separating the upper portion of the housing from the apparatus of FIG. 1.

Referring to FIGS. 1 to 4, the conventional ballast water filtering apparatus includes a housing a having an inlet and an outlet which permits the inflow and outflow of the ballast water, a filter b filtering the ballast water which flows in the housing a, a core c serving as a discharge passage for foreign substances fed through a suction nozzle which sucks foreign substances adhering to the filter b, and a driving shaft d driving the core c. The housing a has the inlet and the outlet, and is divided into a housing body a1 that defines a space to accommodate the filter b therein, and a housing cover plate a2 that is coupled to the housing body a1 to seal the housing. Particularly, the housing cover plate a2 is integrally coupled at its upper portion with an exhaust unit e which serves to discharge foreign substances passing through the core c.

Thus, as shown in FIG. 2, when a worker desires to couple the housing cover plate a2 to the housing body a1, first, the core c and the driving shaft d must be coupled to each other. Subsequently, the housing cover plate a2 is coupled to the housing body. If the housing cover plate a2 is first coupled to the housing body, it is impossible to couple the core c with the driving shaft d using the exhaust unit e, so that it is difficult to easily couple the housing cover plate with the housing body. Particularly, the housing cover plate a2 is integrated with the exhaust unit e, so that the weight comes to about 1 ton. Thus, it is more difficult to precisely align and couple the housing cover plate a2 with the driving shaft d, the core c, the filter b and the housing body a1 using a crane. Furthermore, disassembly work is also complicated.

Further, in the conventional filtering apparatus for treating ballast water, as shown in FIG. 3, when it is required to couple the core c with the driving shaft d, the driving shaft d is inserted into a predetermined portion of the core c, and then the driving shaft d and the core c are joined together using the spring pin c1 which passes through the outer circumference of the core c to be inserted therein. The spring pin c1 used in this apparatus is constructed so that it is hollow therein, and is cut at a predetermined portion thereof. Thus, when the spring pin is inserted into the core, the core c and the driving shaft d are firmly coupled to each other by the elasticity of the spring pin. However, the spring pin c1 is hollow therein, so that its strength is weak. Thereby, the spring pin is apt to break or be corroded when there are frequent vertical movements and rotations of the driving shaft d and the core c and the spring pin is used in a marine environment where there is a high salt concentration, so that durability is low.

Further, since the spring pin c1 passes through the outer circumference of the core c to be inserted therein, the length of the spring pin is almost equal to the diameter of the core c. If the elasticity of the spring pin c1 is reduced because of the frequent vertical movements and rotations of the driving shaft d and the core c and vibrations, a portion of the spring pin c1 may be moved out of the core. In this case, when raising the housing cover plate a2 for the future disassembly or replacement as shown in FIG. 4, the housing cover plate a2 may be caught by the portion of the spring pin c1 which is moved out of the core, so that it becomes more difficult to disassemble the housing cover plate a2 using a crane.

Further, if a space (especially, the upper space), such as a ship, in which the ballast water filtering apparatus is installed is not sufficiently large and is limited, it is necessary that the driving shaft d and the core c be previously separated so as to pull the core c and the driving shaft d out of the housing a.

DISCLOSURE

Technical Problem

Accordingly, the present invention has been made keeping in mind the above problems occurring in the prior art, and an object of the present invention is to provide a filtering apparatus for treating ballast water, which is constructed so that a housing cover plate and an exhaust unit are removably coupled to each other at an upper position of a housing, thus enabling the easy assembly, disassembly, and maintenance of the filtering apparatus.

Another object of the present invention is to provide a filtering apparatus for treating ballast water, in which an exhaust unit includes a base flange on a portion thereof coupled to a housing cover plate, and the base flange includes a projecting step that projects to be inserted into a core through hole formed in the housing cover plate, thus allowing the exhaust unit to be precisely and easily coupled to the housing cover plate using the core through hole that is formed in the housing cover plate.

A further object of the present invention is to provide a filtering apparatus for treating ballast water, in which a core serving as the discharge passage of foreign substances includes a shaft coupling unit on a portion thereof coupled to a driving shaft, and is coupled at the shaft coupling unit to the driving shaft via a coupling means, and the outer diameters of the coupling means and the shaft coupling unit are formed to be smaller than the outer diameter of the core, thus enabling easy assembly or disassembly of an exhaust unit or a housing cover plate.

Yet another object of the present invention is to provide a filtering apparatus for treating ballast water, in which a coupling means for coupling a core with a driving shaft is a solid key, and the coupling means is welded to the shaft coupling unit after the coupling has been conducted, thus preventing the coupling means from being broken or removed even in spite of frequent rotations or vertical movements.

Still another object of the present invention is to provide a filtering apparatus for treating ballast water, which is constructed so that a first corner of a driving shaft coupled to a core is chamfered or rounded, thus allowing the driving shaft to foldably rotate about a coupling means in one direction, therefore enabling the driving shaft and the core to be easily pulled out from a housing even though there is a spatial limitation.

Another object of the present invention is to provide a filtering apparatus for treating ballast water, in which a second corner of a driving shaft is formed to have a right angle, thus keeping the driving shaft coupled to a core in a vertical position, therefore enabling the vertical movement and rotation of the driving shaft to be transmitted to the core unchanged.

Another object of the present invention is to provide a filtering apparatus for treating ballast water, in which coupled portions include sealing means between components of a suction nozzle, that is, between a filter contact part and a guide part, between a suction-rod coupling part and a support part, and between the support part and a guide part, thus preventing non-filtered ballast water, present inside a filter, from flowing into the suction nozzle and being discharged through an exhaust unit.

Technical Solution

In order to accomplish the above objects, the present invention provides a filtering apparatus for treating ballast water having the following construction.

According to an embodiment of the present invention, a filtering apparatus for treating ballast water includes a housing having an inlet and an outlet which permits inflow and outflow of the ballast water, a filter filtering the ballast water which flows in the housing, and an automatic washing unit washing away foreign substances adhering to the filter. The automatic washing unit includes a driving unit driving the automatic washing unit in response to a signal of the control unit, a suction unit movably connected to the driving unit to suck the foreign substances adhering to the filter, and an exhaust unit exhausting the foreign substances sucked by the suction unit, and the housing is constructed so that a housing cover plate coupled to an end of a housing body is removably coupled to the exhaust unit, thus enabling easy assembly, disassembly and maintenance.

According to another embodiment of the present invention, the exhaust unit may include a base flange on an end thereof which is coupled to the housing cover plate, and the base flange may include a projecting step which projects to be inserted into a core through hole formed in the housing cover plate, so that the exhaust unit is precisely and easily coupled to the housing cover plate using the core through hole formed in the housing cover plate.

According to a further embodiment of the present invention, the suction unit may include a suction rod equipped with a suction nozzle which sucks the foreign substances adhering to the filter, and a core connected to the suction rod to move the sucked foreign substances, the driving unit may include a driving shaft which is connected to the core and is operated by a power source to move the core, and the core may include a shaft coupling unit which protrudes from an end thereof coupled to the driving shaft, so that the core is coupled at the shaft coupling unit to the driving shaft via coupling means.

According to another embodiment of the present invention, the coupling means may be a solid key, and may be welded to the shaft coupling unit after coupling has been completed.

According to another embodiment of the present invention, outer diameters of the coupling means and the shaft coupling unit may be formed to be smaller than an outer diameter of the core, thus enabling easy assembly or disassembly of the exhaust unit or the housing cover plate.

According to another embodiment of the present invention, the shaft coupling unit may include a first connection hole, and the driving shaft may include a second connection hole which is provided in a portion thereof coupled to the shaft coupling unit and is aligned with the first connection hole in a line, so that the coupling means is inserted into the first and second connection holes.

According to another embodiment of the present invention, a first corner of the driving shaft in which the second connection hole is formed may be chamfered or rounded, so that the driving shaft can rotate about the coupling means, and thus the driving shaft and the core can be easily pulled out of the housing even if there is a spatial limitation.

According to another embodiment of the present invention, a second corner of the driving shaft in which the second connection hole is formed may have a right angle, thus keeping the driving shaft coupled to the core in a vertical position, therefore allowing vertical and rotary movements of the driving shaft to be transmitted to the core unchanged.

According to another embodiment of the present invention, the suction nozzle may include a filter contact part making contact with the filter and having a hole to permit inflow of foreign substances, a guide part coupled to the filter contact part and guiding the foreign substances, fed through the hole, to the suction rod, an elastic means providing an elastic force to permit movement of the filter contact part and the guide part, and a support part coupled to the suction-rod coupling part which is connected to the suction rod, and supporting an end of the elastic means. A sealing means may be provided in each of coupled portions between the filter contact part and the guide part, between the suction-rod coupling part and the support part and between the support part and the guide part, thus preventing non-filtered foreign substances present inside the filter from flowing into the suction nozzle and being discharged through the exhaust unit.

According to another embodiment of the present invention, the elastic means may be provided outside the guide part in such a way as to be located between the filter contact part and the support part.

Advantageous Effects

The construction, assembly, and use of present invention can achieve the following effects.

The filtering apparatus for treating ballast water according to the present invention is advantageous in that a housing cover plate and an exhaust unit are removably coupled to each other at an upper position of a housing, thus enabling the easy assembly, disassembly, and maintenance of the filtering apparatus.

The filtering apparatus for treating ballast water according to the present invention is advantageous in that an exhaust unit includes a base flange on a portion thereof coupled to a housing cover plate, and the base flange includes a projecting step that projects to be inserted into a core through hole formed in the housing cover plate, thus allowing the exhaust unit to be precisely and easily coupled to the housing cover plate using the core through hole that is formed in the housing cover plate.

The filtering apparatus for treating ballast water according to the present invention is advantageous in that a core serving as the discharge passage of foreign substances includes a shaft coupling unit on a portion thereof coupled to a driving shaft, and is coupled at the shaft coupling unit to the driving shaft via a coupling means, and the outer diameters of the coupling means and the shaft coupling unit are formed to be smaller than the outer diameter of the core, thus enabling easy assembly or disassembly of an exhaust unit or a housing cover plate.

The filtering apparatus for treating ballast water according to the present invention is advantageous in that a coupling means for coupling a core with a driving shaft is a solid key, and the coupling means is welded to the shaft coupling unit after the coupling has been conducted, thus preventing the coupling means from being broken or removed even in spite of frequent rotations or vertical movements.

The filtering apparatus for treating ballast water according to the present invention is advantageous in that a first corner of a driving shaft coupled to a core is chamfered or rounded, thus allowing the driving shaft to foldably rotate about a coupling means in one direction, therefore enabling the driving shaft and the core to be easily pulled out from a housing even though there is a spatial limitation.

The filtering apparatus for treating ballast water according to the present invention is advantageous in that a second corner of a driving shaft is formed to have a right angle, thus keeping the driving shaft coupled to a core in a vertical position, therefore enabling the vertical movement and rotation of the driving shaft to be transmitted to the core unchanged.

The filtering apparatus for treating ballast water according to the present invention is advantageous in that coupled portions include sealing means between components of a suction nozzle, that is, between a filter contact part and a guide part, between a suction-rod coupling part and a support part, and between the support part and a guide part, thus preventing non-filtered ballast water, present inside a filter, from flowing into the suction nozzle and being discharged through an exhaust unit.

Figure 1:
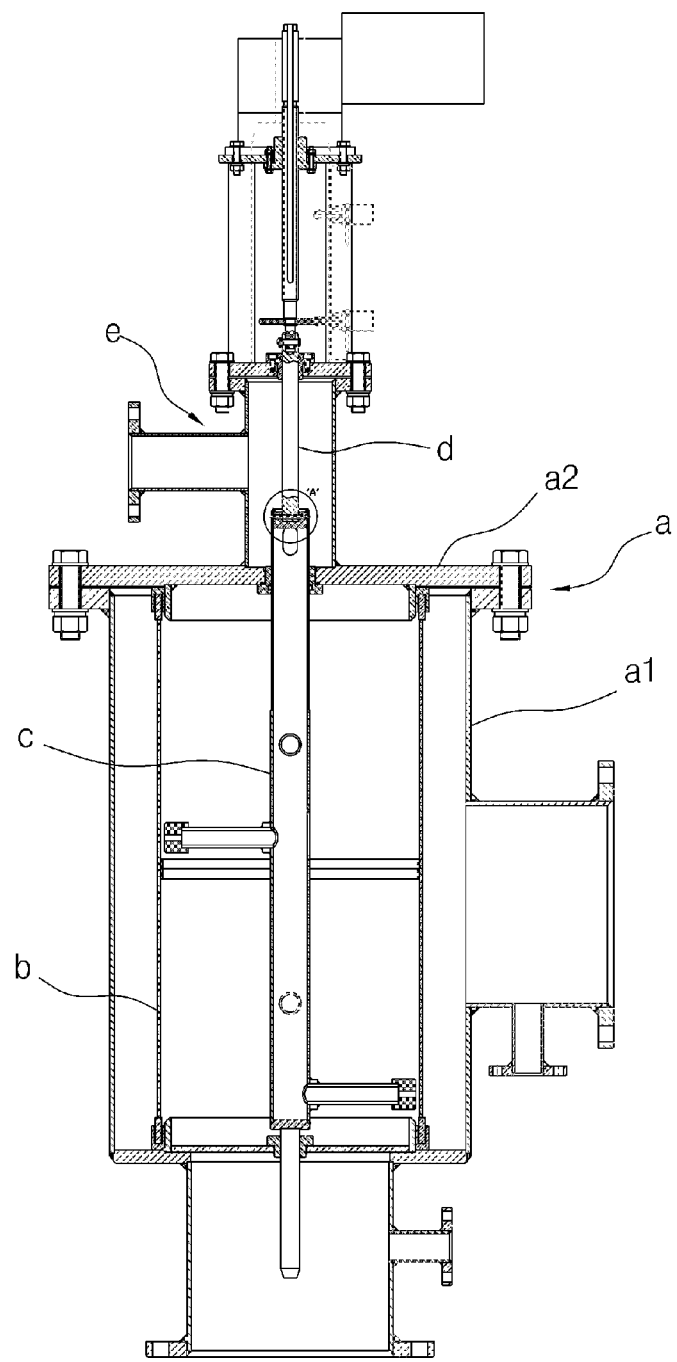
FIG. 1 is a sectional view showing a conventional ballast water filtering apparatus.

| *Description of reference characters of important parts | | | |
|---|---|---|---|
| 10: housing | 110: housing body | 111: inlet | 112: outlet |
| 120: housing cover plate | 121: core through hole | 122: bushing | 30: filter |
| 50: automatic washing unit | 510: driving unit | | |
| 511: driving shaft (511': first driving shaft, 511": second driving shaft) | 512: motor | | |
| 5111: contact means | 5112: limit switch | | |
| 5113: second connection hole | 5114: first corner | | |
| 5115: second corner | 5116: projecting end | | |
| 520: suction unit | 521: suction nozzle | | |
| 522: suction rod | 523: core | | |
| 5211: filter contact part | 52111: hole | | |
| 5212: guide part | 5213: elastic means | | |
| 5214: support part | 5215: suction-rod coupling part | | |
| 5216: sealing means | | | |
| 5231: exhaust hole | 5232: shaft coupling unit | | |
| 52321: first connection hole | 52322: base member | | |
| 52323: protrusion | 530: exhaust unit | | |
| 531: flushing chamber | 532: exhaust pipe | | |
| 533: exhaust valve | | | |
| 534: base flange | 5341: projecting step | | |
| 540: coupling means | 541: head | | |
| Description of reference characters of prior art | | | |
| a: housing | a1: housing body | | |
| a2: housing cover plate | b: filter | c: core | |
| c1: spring pin | d: driving shaft | e: exhaust unit | |

BEST MODE

Hereinafter, a filtering apparatus for treating ballast water according to the preferred embodiment of the present invention will be described in detail with reference to the accompanying drawings.

Figure 5:
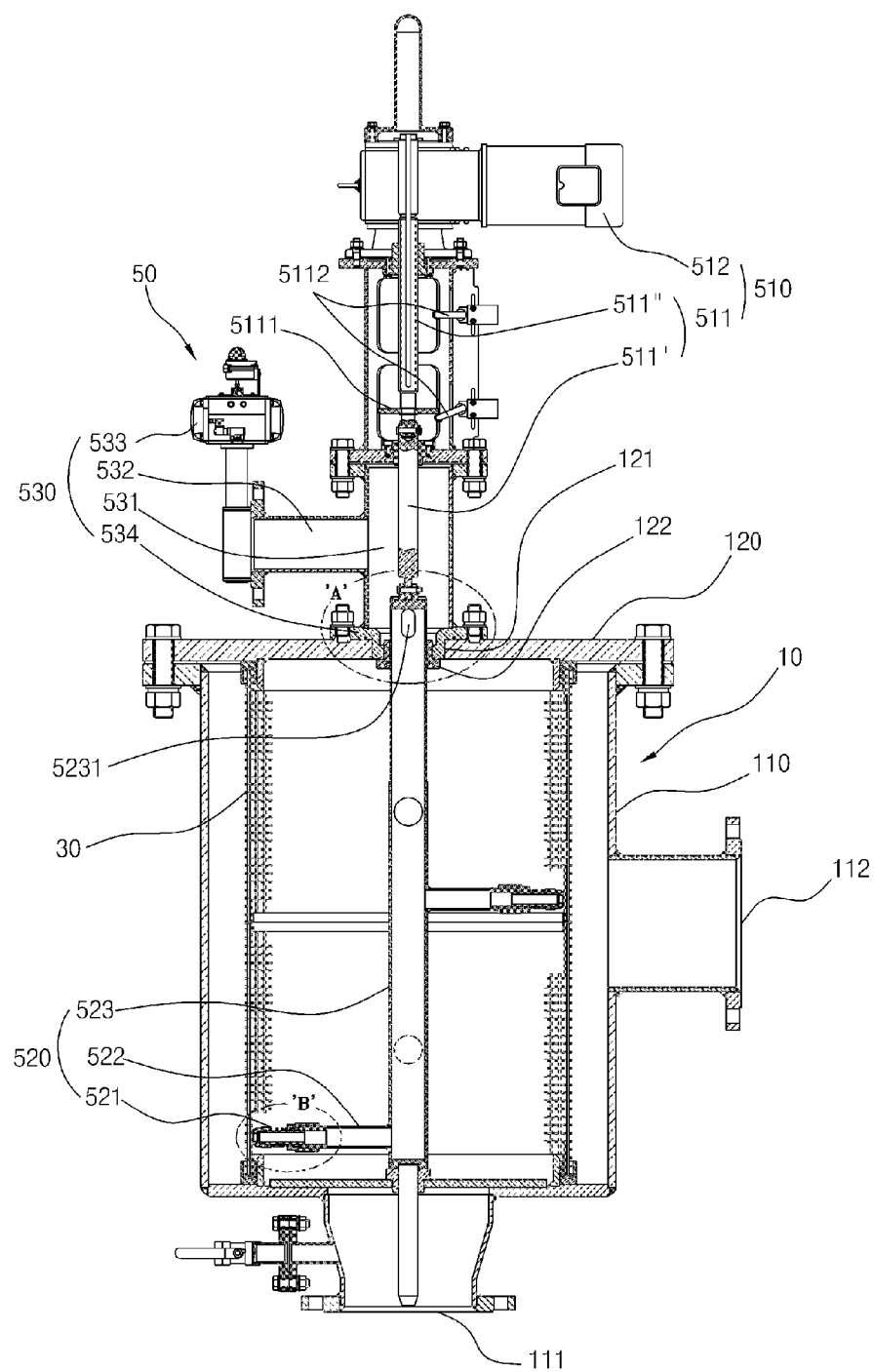
FIG. 5 is a sectional view showing a filtering apparatus for treating ballast water according to an embodiment of the present invention.
Figure 6:
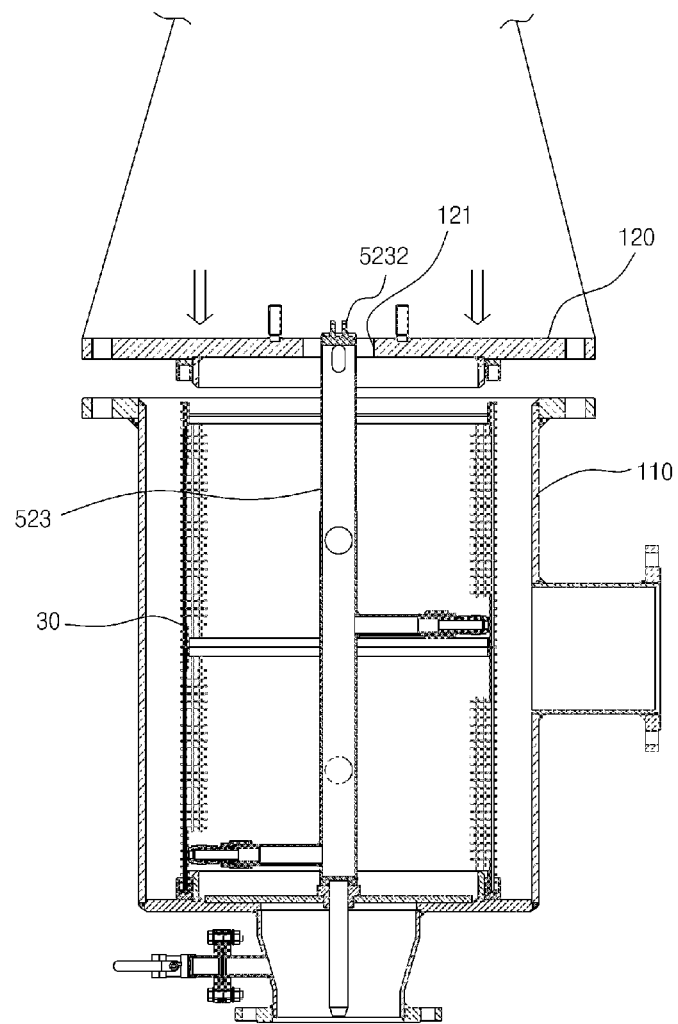
FIGS. 6 to 8 are views showing the process of coupling a housing cover plate, a driving shaft, and an exhaust unit to the filtering apparatus of FIG. 5.
Figure 7:
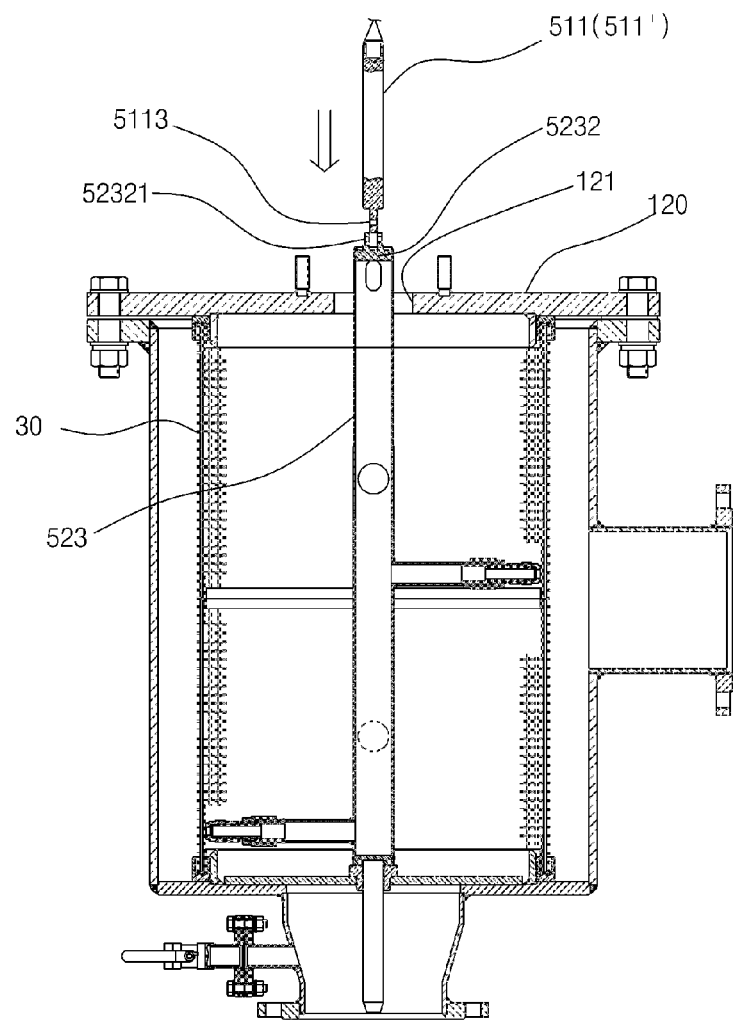
Figure 8:
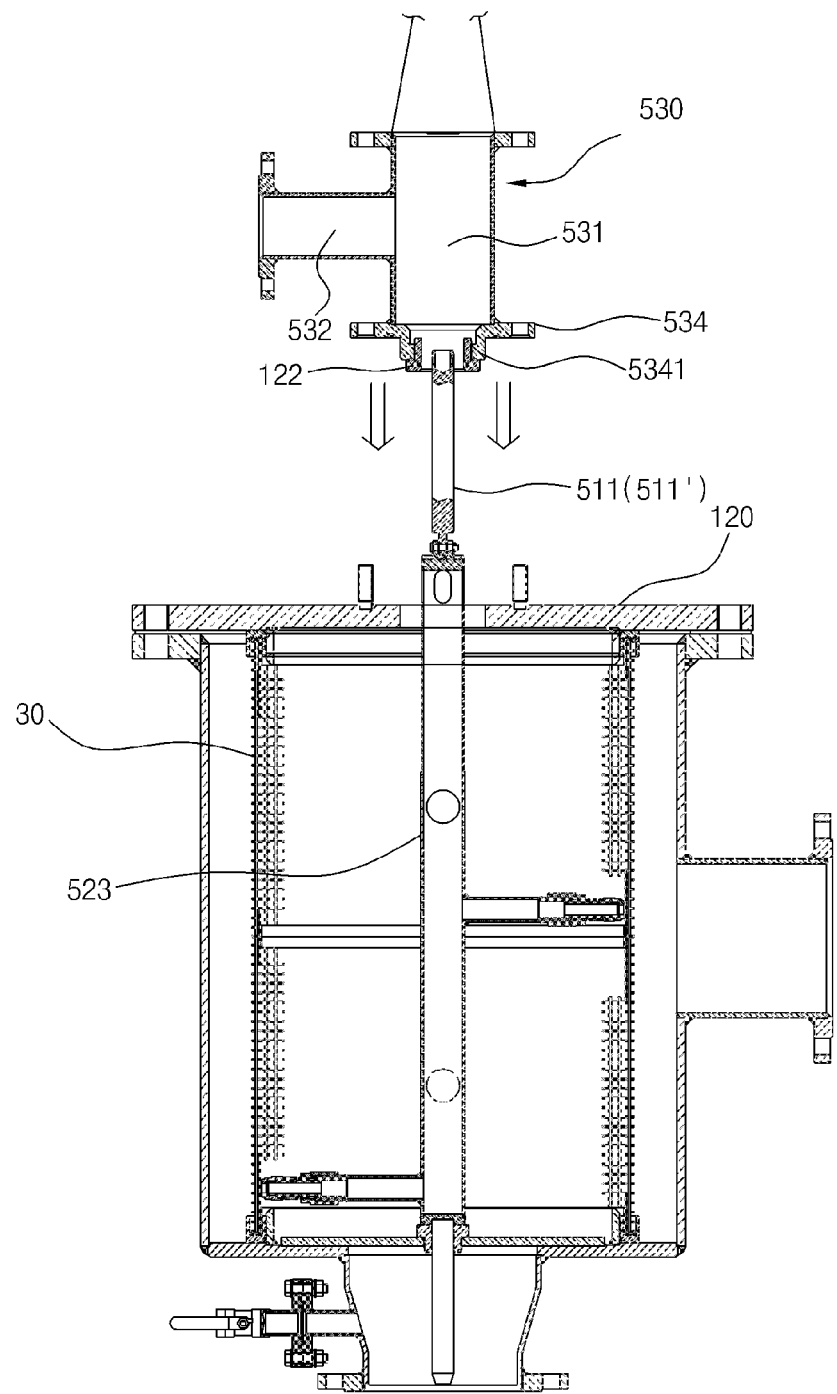
Figure 9:
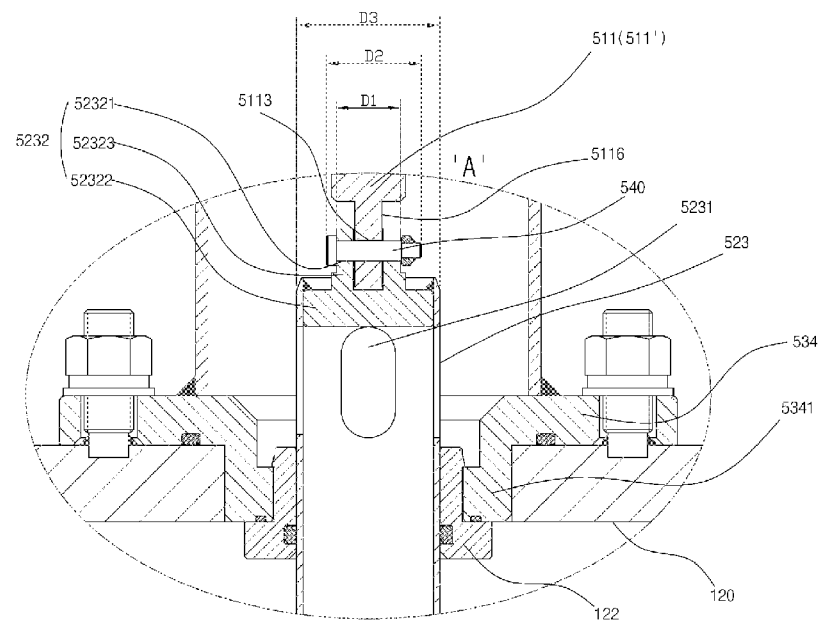
FIG. 9 is an enlarged sectional view showing a portion where the driving shaft is coupled with a core in the filtering apparatus of FIG. 5.
Figure 10:
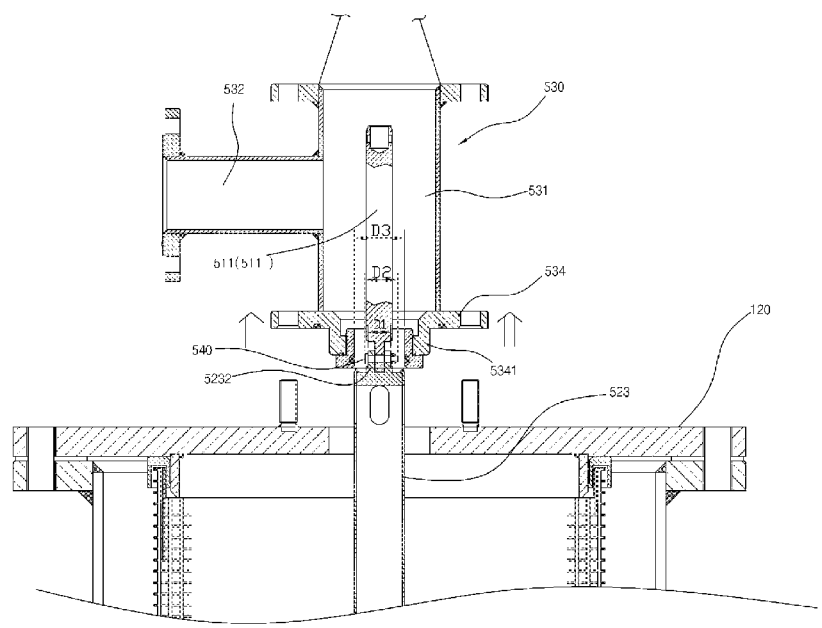
FIG. 10 is a view showing the process of disassembling the exhaust unit from the filtering apparatus of FIG. 5.
Figure 11:
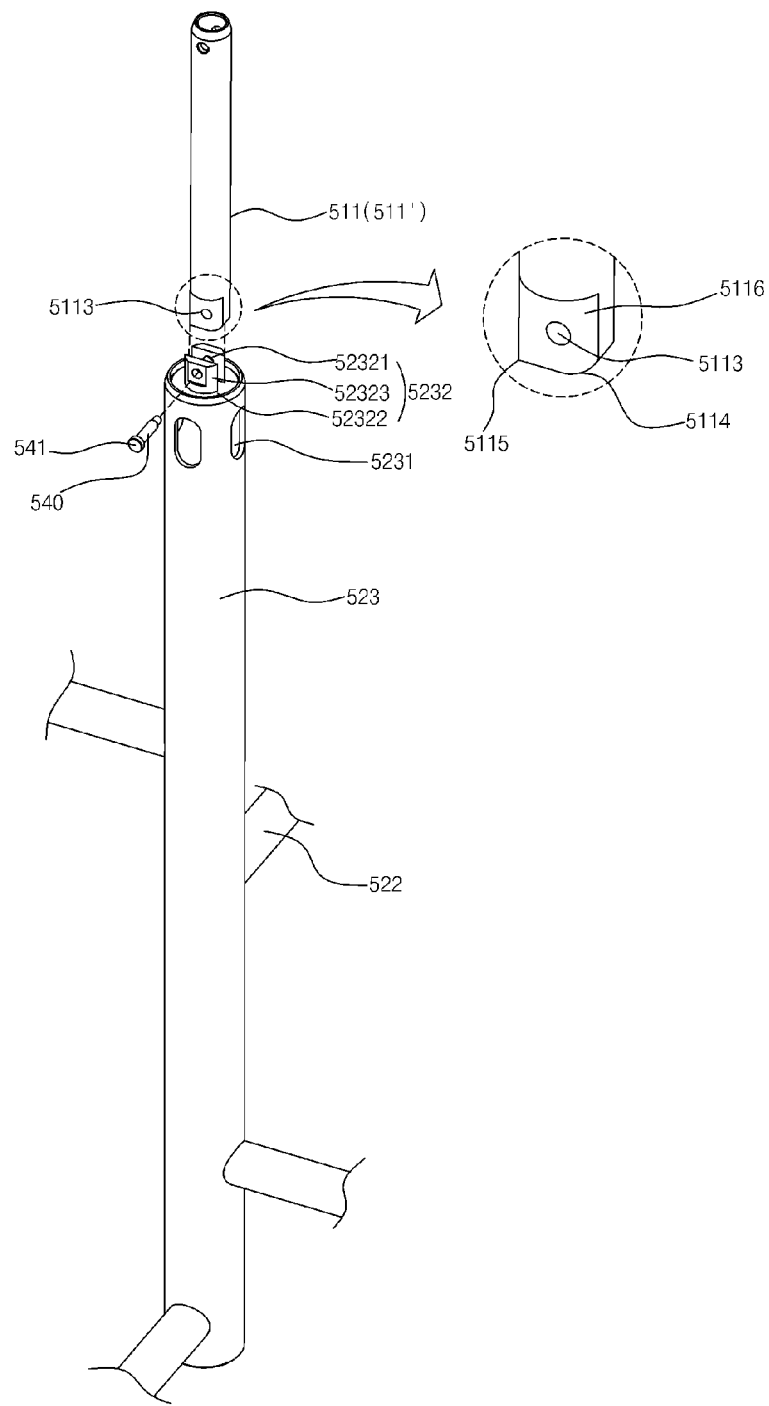
FIG. 11 is an exploded perspective view showing the driving shaft coupled to a shaft coupling unit in the filtering apparatus of FIG. 5.
Figure 12:
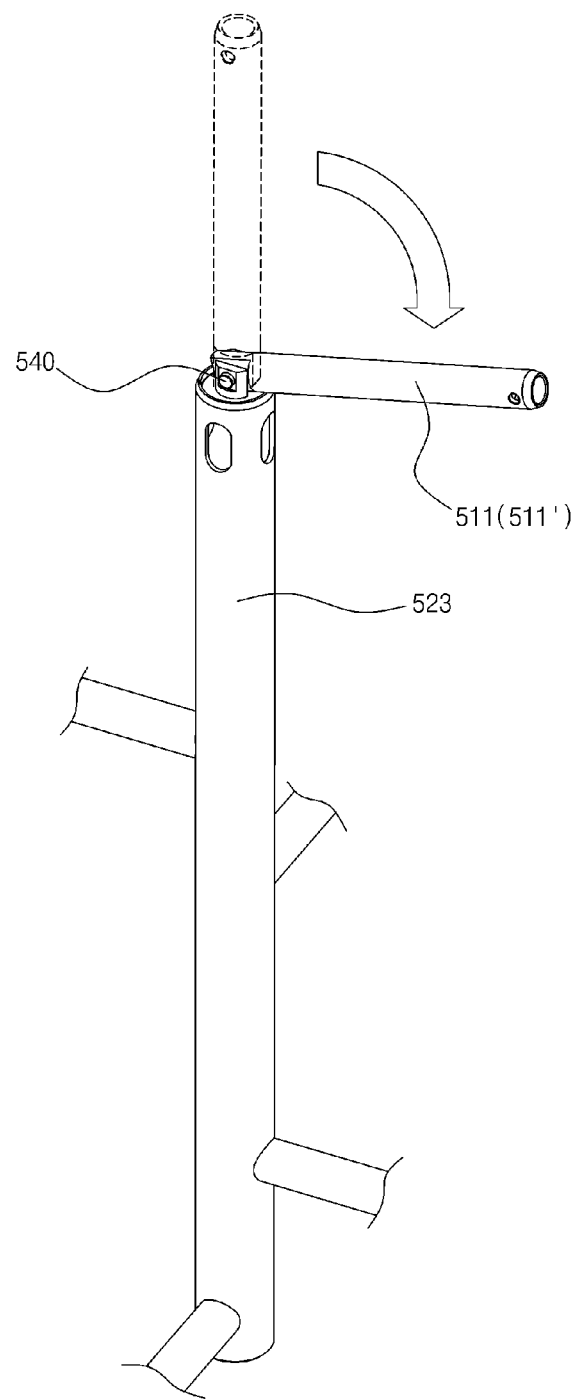
FIG. 12 is a view showing the driving shaft of FIG. 11 which is rotated about a coupling means.
Figure 13:
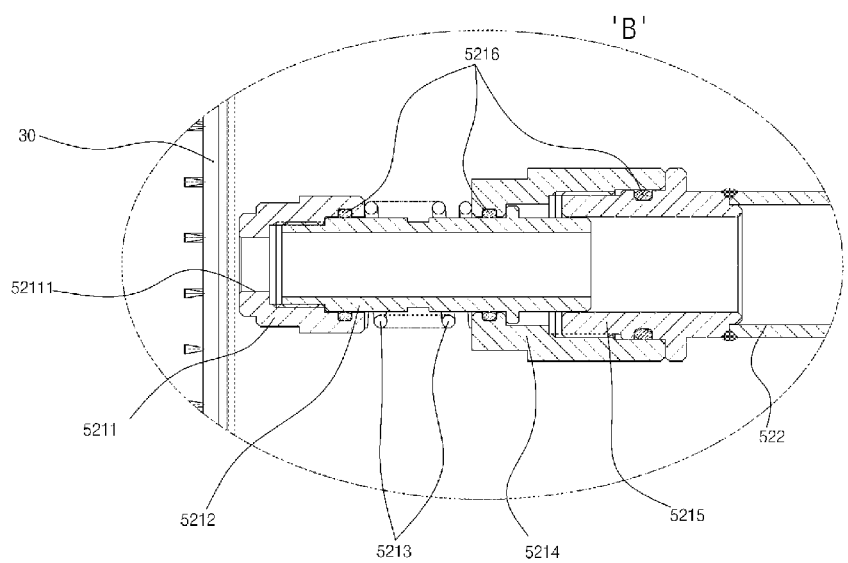
FIG. 13 is an enlarged sectional view showing a suction nozzle in the filtering apparatus of FIG. 5.

FIG. 5 is a sectional view showing a filtering apparatus for treating ballast water according to an embodiment of the present invention, FIGS. 6 to 8 are views showing the process of coupling a housing cover plate, a driving shaft, and an exhaust unit to the filtering apparatus of FIG. 5, FIG. 9 is an enlarged sectional view showing a portion where the driving shaft is coupled with a core in the filtering apparatus of FIG. 5, FIG. 10 is a view showing the process of disassembling the exhaust unit from the filtering apparatus of FIG. 5, FIG. 11 is an exploded perspective view showing the driving shaft coupled to a shaft coupling unit in the filtering apparatus of FIG. 5, FIG. 12 is a view showing the driving shaft of FIG. 11 which is rotated about a coupling means, and FIG. 13 is an enlarged sectional view showing a suction nozzle in the filtering apparatus of FIG. 5.

Referring to FIGS. 5 to 13, a filtering apparatus for treating ballast water according to an embodiment of the present invention includes a housing 10, a filter 30, and an automatic washing unit 50. The housing 10 has an inlet 111 and an outlet 112 to permit the inflow and outflow of the ballast water. The filter 30 filters the ballast water which passes through the housing 10. The automatic washing unit 50 functions to wash away foreign substances adhering to the filter 30. The automatic washing unit 50 includes a driving unit 510 which drives the automatic washing unit in response to a signal from a control unit (not shown), a suction unit 520 which is movably connected to the driving unit 510 to suck foreign substances from the filter 30, and an exhaust unit 530 which discharges the foreign substances sucked by the suction unit 520. The housing 10 is constructed so that a housing cover plate 120 coupled to an end of a housing body 110 is removably coupled to the exhaust unit 530, thus enabling easy assembly, disassembly, and maintenance.

The housing 10 defines a body of the filtering apparatus according to the present invention, and has a space to receive the filter 30 therein. The housing may preferably have the shape of a cylinder to receive the cylindrical filter 30, and includes the inlet 111 into which the ballast water put into the ship is introduced, and the outlet 112 through which filtered ballast water is discharged. As shown in FIG. 5, it is preferable that the inlet 111 be located at a lower position of the housing 10 and the outlet 112 be located above the inlet 111 so that ballast water flowing to the lower portion of the housing is filtered while filling the interior of the housing 10. The housing 10 mainly includes the housing body 110 which accommodates the filter 30 and the suction unit 520 of the automatic washing unit, and the housing cover plate 120 which is coupled to an end of the housing body 110 and closes the housing 10 after the filter 30 and the suction unit 520 of the automatic washing unit are accommodated in the housing body 110. As mentioned in the background art, the conventional apparatus is problematic in that it is difficult to precisely perform the coupling operation of the housing cover plate 120 which is heavy because it is made of steel or alloy and is integrated with the exhaust unit 530 that will be described below in detail, especially in a limited work space, with the filter 30 and the suction unit 520 of the automatic washing unit accommodated in the housing body 110. In order to solve the problem, according to the present invention, the housing cover plate 120 is removably coupled to the exhaust unit 530. Such a construction will be described below.

The filter 30 functions to filter the ballast water introduced into the housing 10 through the inlet 111, and may preferably have a cylindrical shape along the inner circumference of the housing 10 to surround the interior of the housing 10. Thus, in order to discharge the ballast water, which flows through the inlet 111 into the housing 10, through the outlet 112, the ballast water must necessarily pass through the filter 30. While the ballast water is filtered by the filter 30, organisms and particles over 50 μm in size are removed. In the case of continuously performing the filtering operation, foreign substances accumulate in the inner surface of the filter 30, so that the filtering function is deteriorated and thus the operation of removing foreign substances is performed by the automatic washing unit 50 that will be described below.

The automatic washing unit 50 serves to automatically remove foreign substances from the inner surface of the filter 30 under the control of the control unit (not shown) using a difference in pressure between the inside and the outside of the filter 30. The automatic washing unit includes the driving unit 510, the suction unit 520, and the exhaust unit 530. The driving unit 510 drives the automatic washing unit 50 in response to a signal from the control unit (not shown). The suction unit 520 is movably connected to the driving unit 510, thus sucking foreign substances adhering to the filter 30. The exhaust unit 530 functions to discharge foreign substances which have been sucked by the suction unit 520.

The driving unit 510 serves to provide the power that rotates and vertically moves the automatic washing unit 50, especially the suction unit 520, and includes a driving shaft 511 and a motor 512. The driving shaft 511 transmits a driving force generated by the general motor 512 or the like and is connected to a core 523 of the suction unit 520, thus vertically moving and rotating the core 523 under the control of the control unit (not shown). The outer circumference of the driving shaft 511 may be formed to have thread. Such a construction enables the vertical movement and the rotation of the driving shaft as the motor 512 is operated, thus allowing the suction unit 520 to more efficiently suck foreign substances from the filter 30. Further, a contact means 5111 may be coupled to an end of the driving shaft 511. The contact means 5111 is a part that comes into contact with limit switches 5112 which limit the vertical moving distance of the driving shaft 511. When the contact means 5111 is in contact with each limit switch 5112, the moving direction of the driving shaft 511 changes under the control of the control unit (not shown), so that the driving shaft 511 moves up and down between the limit switches 5112. Further, the driving shaft 511 may be divided into a first driving shaft 511' and a second driving shaft 511" as shown in FIG. 5. Conventionally, after the driving shaft 511, especially the first driving shaft 511' is coupled to the core 523, the housing cover plate 120 must be coupled to the housing body. This causes low durability to the coupling structure of the driving shaft 511, especially the first driving shaft 511' with the core 523. In order to solve the problem, the present invention proposes a construction, which will be described below.

The suction unit 520 is a part which is moved by power transmitted from the driving unit 510, thus sucking foreign substances from the filter 30. The suction unit may include a suction rod 522 which is equipped with a suction nozzle 521 that sucks foreign substances from the filter 30, and the core 523 which is connected to the suction rod 522 to move the sucked foreign substances. The suction nozzle 521 is a part which is in close contact with the inner surface of the filter 30 to suck foreign substances from the inner surface. The suction nozzle sucks foreign substances from the inner surface of the filter 30 using a suction force generated by the operation of an exhaust valve 533 of the exhaust unit 530. The filtering apparatus according to the present invention includes components for preventing non-filtered ballast water from being sucked and discharged through the suction nozzle 521, and the components will be described below. The suction rod 522 has the shape of a rod or bar which has a through hole therein. The suction nozzle 521 is provided on one end of the suction rod, and the other end is connected to the core 523 to move the sucked foreign substances to the core 523. A plurality of suction rods 522 may be radially attached to the outer circumference of the core 523 in such a way that they have different heights. Such a construction allows foreign substances to be more easily sucked from the filter 30 when the core 523 moves up and down while rotating, as will be described below. The core 523 is a part which moves foreign substances, sucked and moved by the suction nozzle 521 and the suction rod 522, to discharge the foreign substances through the exhaust unit 530. The core may have the shape of a rod or bar which is hollow therein. An exhaust hole 5231 may be formed in one end of the core 523 so that foreign substances flowing through the internal space are discharged to the flushing chamber 531 of the exhaust unit 530 which will be described below. Further, one end of the core 523 is connected to the driving shaft 511, especially the first driving shaft 511' so that the core may perform rotary movement as well as vertical movement when the driving shaft 511 moves.

The exhaust unit 530 functions to discharge foreign substances from the suction unit 520. The exhaust unit may include a flushing chamber 531, an exhaust pipe 532, and an exhaust valve 533. The flushing chamber 531 stores foreign substances which are discharged through the exhaust hole 5231 formed in one end of the core 523. The exhaust pipe 532 is the passage through which the foreign substances of the flushing chamber 531 are discharged. The exhaust valve 533 is provided at a position of the exhaust pipe 532. The flushing chamber 531 is the part in which foreign substances discharged through the exhaust hole 5231 of the core 523 accumulate. Preferably, the size and shape of the flushing chamber are set in consideration of the distance the core 523 moves up and down so that the flushing chamber may store foreign substances discharged from the exhaust hole 5231 of the core 523 under any circumstance. The exhaust pipe 532 is the passage through which the foreign substances of the flushing chamber 531 are discharged, and may have the shape of a pipe which is connected to a side of the flushing chamber 531. The exhaust valve 533 is connected to a portion of the exhaust pipe 532 and provides a suction force to the sucking unit 520 that sucks foreign substances from the inner surface of the filter 30 to discharge them. The exhaust valve is controlled by the control unit (not shown). That is, when the exhaust valve 533 is open, the interiors of the exhaust pipe 532, the flushing chamber 531, the core 523 and the suction rod 522, and the suction nozzle 521 have atmospheric pressure, that is, are at a pressure lower than the high pressure in the housing 10. The ballast water existing around the suction nozzle 521, especially the filtered ballast water existing outside the filter 30 is sucked into the suction nozzle 521 which is at low pressure. At this time, foreign substances adhering to the inner surface of the filter 30 are also sucked up. Meanwhile, when the exhaust valve 533 is closed, the suction of ballast water and foreign substances is stopped.

The important characteristics of the filtering apparatus for treating ballast water according to the present invention will be described below in detail.

Figure 2:
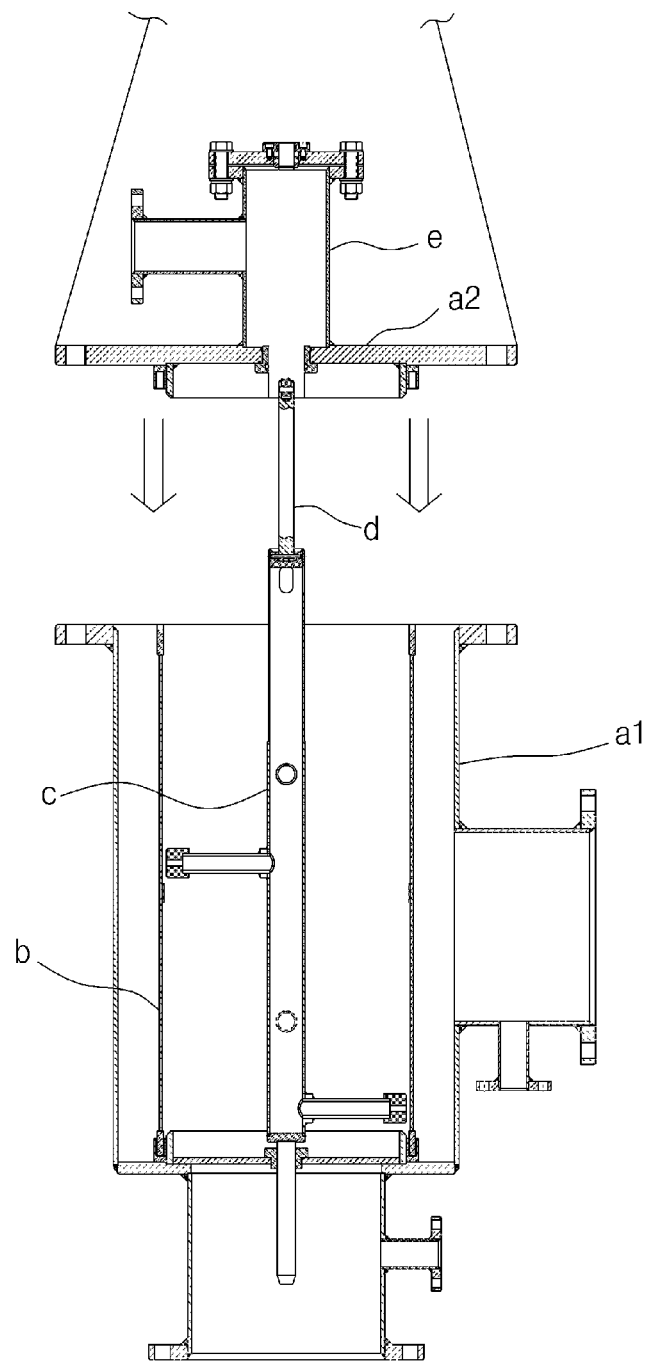
FIG. 2 is a view showing the process of coupling an upper portion of a housing to a housing body, in the apparatus of FIG. 1.

As described above, as shown in FIG. 1, the conventional filtering apparatus for treating ballast water is constructed so that the housing cover plate a2 is integrally at its upper portion with the exhaust unit e which discharges foreign substances passing through the core c. Thus, when it is required to couple the housing cover plate a2 with the housing body a1, as shown in FIG. 2, the core c and the driving shaft d are coupled to each other, and thereafter the housing cover plate a2 is coupled (if the housing cover plate a2 is first coupled, it is impossible to couple the core c with the driving shaft d using the exhaust unit e as the coupling unit), so that it is difficult to couple the housing cover plate with the housing body. Particularly, since the housing cover plate a2 is integrated with the exhaust unit e, the weight generally come to about 1 ton. Thus, it is more difficult to precisely align and couple the housing cover plate a2 with the driving shaft d, the core c, the filter b and the housing body a1 using a crane. Furthermore, disassembly work is also complicated.

Therefore, according to the present invention, as shown in FIG. 5, the housing cover plate 120 is removably coupled with the exhaust unit 530, thus facilitating assembly, disassembly and maintenance. Further, the exhaust unit 530 includes a base flange 534 on a predetermined portion which is to be coupled with the housing cover plate 120, and the base flange 534 includes a projecting step 5341 which is projected to be inserted into a core through hole 121 formed in the housing cover plate 120, thus allowing the exhaust unit 530 to be precisely and easily coupled to the housing cover plate 120 using the core through hole 121 which is formed in the housing cover plate 120.

That is, according to the present invention, the housing cover plate 120 is removably coupled with the exhaust unit 530, especially the flushing chamber 531. Thus, as shown in FIG. 6, in the state in which only the filter 30 and the core 523 are coupled to the housing body 110 (i.e., the state in which the driving shaft 511, especially the first driving shaft 511' is not coupled to the core 523), first, only the housing cover plate 120 can be coupled to the housing body. Thus, one end of the core 523 which protrudes to the outside of the housing 10 by a short length is fitted into the core through hole 121, so that it is easy to couple the housing cover plate 120 to the housing body. Further, it has only to couple the housing cover plate 120 to the housing body without the addition of the weight of the exhaust unit 530 (more accurately, the flushing chamber 531), thus allowing coupling work to be more easily conducted. Next, after the core 523 is coupled to the driving shaft 511 (more accurately, the first driving shaft 511') as shown in FIG. 7, the exhaust unit 530 (more accurately, the flushing chamber 531) is coupled to the housing cover plate 120 while receiving the driving shaft 511 as shown in FIG. 8. At this time, the exhaust unit 530 (more accurately, the flushing chamber 531) may include the base flange 534 on an end coupled to the housing cover plate 120, and the base flange 534 may include the projecting step 5341 which projects to be inserted into the core through hole 121 formed in the housing cover plate 120. Since the exhaust unit 530 is sequentially coupled to the housing cover plate 120, it is important to couple the exhaust unit 530 at a precise position and enable easy coupling. Thus, in order to easily couple the exhaust unit 530 to the precise position using the existing core through hole 121 which is formed in the housing cover plate 120 so that the core 523 passes therethrough, the base flange 534 is provided on an end of the exhaust unit 530, and the base flange 534 includes the projecting step 5341 which projects to a predetermined length to be precisely inserted into the core through hole 121 and is formed to correspond to the size of the core through hole 121. Hence, merely by precisely inserting the projecting step 5341 into the core through hole 121 at the time of coupling the exhaust unit 530, the exhaust unit 530 can be precisely and easily coupled to the housing cover plate 120. When the projecting step 5341 is inserted into the core through hole, a bushing 122 is inserted between the projecting step 5341 and the core 523, thus preventing the outer circumference of the core 523 that repeats rotations and vertical movements from coming into direct contact with the projecting step 5341, therefore preventing the core from being damaged, and the core 523 is press-fitted into the bushing 122 to maintain a precise vertical state. As such, when the housing cover plate 120 is removably coupled with the exhaust unit 530 (more accurately, the flushing chamber 531), it also allows for easy disassembly. Especially, when a problem occurs in a coupled portion between the driving shaft 511 (more accurately, the first driving shaft 511') and the core 523, so that the repair of the coupled portion is required, the repairing operation can be performed merely by separating the exhaust unit 530 from the housing cover plate without the necessity of disassembling the housing cover plate 120. Further, even when the internal components including a nozzle or the filter are repaired or replaced, it is only required to separate the exhaust unit 530 from the housing cover plate 120 so as to raise the housing cover plate 120. Such a construction facilitates the repair or replacement.

Figure 3:
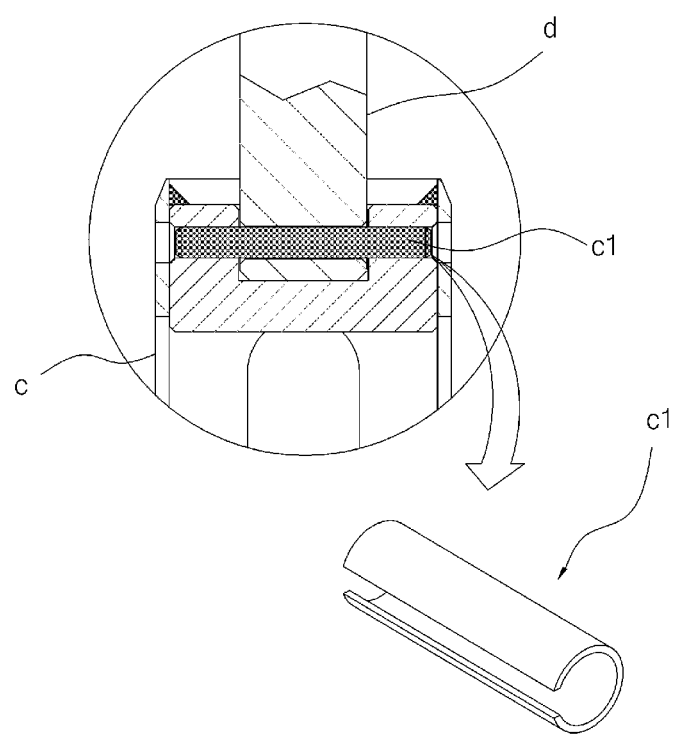
FIG. 3 is a view showing a coupling relation between a core and a driving shaft of FIG. 1.
Figure 4:
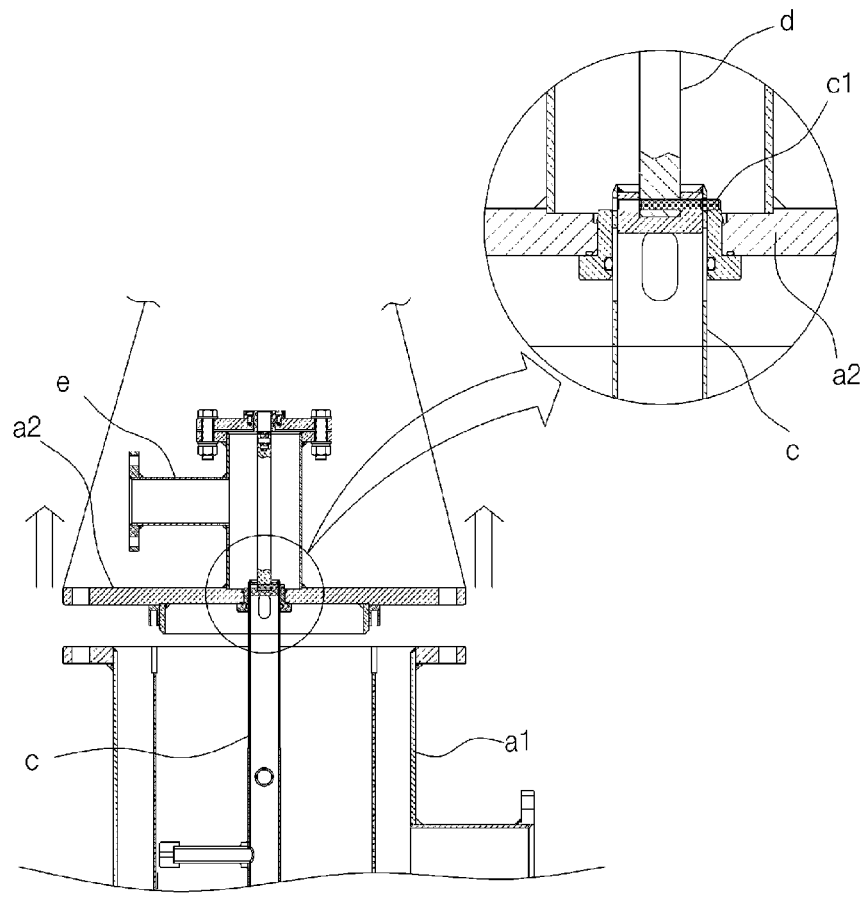
FIG. 4 is a view showing the process of separating the upper portion of the housing from the apparatus of FIG. 1.

Further, in the conventional filtering apparatus for treating ballast water, as shown in FIG. 3, when it is required to couple the core c with the driving shaft d, the driving shaft d is inserted into a predetermined portion of the core c, and then the driving shaft d and the core c are joined together using the spring pin c1 which passes through the outer circumference of the core c to be inserted therein. The spring pin c1 used in this apparatus is constructed so that it is hollow therein, and is cut at a predetermined portion thereof. Thus, when the spring pin is inserted into the core, the core c and the driving shaft d are firmly coupled to each other by the elasticity of the spring pin. However, the spring pin c1 is hollow therein, so that its strength is weak and thus the spring pin is apt to break because of the frequent vertical and rotary movements of the driving shaft d and the core c, thus resulting in low durability. Further, since the spring pin c1 passes through the outer circumference of the core c to be inserted therein, the length of the spring pin is almost equal to the diameter of the core c. If the elasticity of the spring pin c1 is reduced because of the frequent vertical and rotary movements of the driving shaft d and the core c and vibrations, a portion of the spring pin c1 may be moved out of the core. In this case, when raising the housing cover plate a2 for the future disassembly or replacement as shown in FIG. 4, the housing cover plate a2 may be caught by the portion of the spring pin c1 which is moved out of the core, so that it becomes more difficult to disassemble the housing cover plate a2 using a crane.

Therefore, according to the present invention, as shown in FIG. 9, the core 523 forms a shaft coupling unit 5232 on an end which is coupled to the driving shaft 511 (more accurately, the first driving shaft 511'), so that the core is coupled to the driving shaft 511 by a coupling means 540 at the shaft coupling unit 5232. Here, the coupling means 540 is a solid key, and is welded to the shaft coupling unit 5232 after the coupling has been completed. Particularly, the outer diameters of the coupling means 540 and the shaft coupling unit 5232 are formed to be smaller than the outer diameter of the core 523, thus increasing the durability of the coupling means 540, and facilitating the assembly or disassembly of the exhaust unit 530 or the housing cover plate 120.

That is, according to the present invention, in order to couple the core 523 with the driving shaft 511 (more accurately, the first driving shaft 511'), the shaft coupling unit 5232 is additionally formed to protrude from an end of the core 523. As shown in FIGS. 9 and 11, the shaft coupling unit 5232 includes a base member 52322 which defines the lower portion of the shaft coupling unit, a protrusion 52323 which protrudes upwards from the base member, and a first connection hole 52321 which is formed in the protrusion 52323. Here, a pair of protrusions 52323 may be provided to receive a projecting end 5116 at right and left sides, so that the protrusions can be easily and firmly coupled to the projecting end 5116 which will be described below. Further, the driving shaft 511 includes a second connection hole 5113 which is formed in the projecting end 5116 projecting from an end coupled to the shaft coupling unit 5232 and is aligned with the first connection hole 52321 in a line. Thus, the coupling means 540 is inserted into the first and second connection holes 52321 and 5113 to couple the core 523 with the driving shaft 511. Particularly, as shown in FIG. 9, the outer diameter D1 of the shaft coupling unit 5232 and the outer diameter D2 of the coupling means 540 are formed to be smaller than the outer diameter D3 of the core 523. Thereby, when the exhaust unit 530 (more accurately, the flushing chamber 531) is coupled to the housing cover plate or the exhaust unit 530 is separated therefrom as shown in FIG. 10, the inner circumference of the base flange 534 or the projecting step 5341 can smoothly move out of the core 523 without interfering with the shaft coupling unit 5232 or the coupling means 540, thus enabling easier disassembly.

Further, according to the present invention, the coupling means 540 comprises a solid key which is solid. A protruding head 541 is provided on one end of the coupling means, and the other end is welded to the shaft coupling unit 5232 in such a way as to protrude from the shaft coupling unit 5232 by a predetermined length, thus increasing the durability of the coupling means 540. As described above, the driving shaft 511 and the core 523 continue to rotate and move vertically so as to remove foreign substances from the filter 30. Because of the continuous rotation and vertical movement and vibrations, the coupling means 540 which couples the driving shaft 511 with the core 523 may be undesirably broken or damaged or dislodged from its original position. Thus, the coupling means 540 comprises a rod-shaped key which is solid, in place of the hollow spring pin of the prior art, thus improving durability so that the coupling means 540 is not easily broken or damaged by external force or vibrations. Particularly, the coupling means 540 comprising the solid key has on one end thereof the protruding head 541, and the other end protrudes from the shaft coupling unit 5232 by a predetermined length and then is welded to the shaft coupling unit 5232. Such a construction prevents the coupling means 540 from being dislodged from a preset position in spite of the continuous application of external force or vibrations, thus allowing the force of the driving shaft 511 to be smoothly transmitted to the core 523, preventing the driving shaft from unexpectedly separating from the core, and allowing the disassembly of the exhaust unit 530 or the housing cover plate 120 to be smoothly conducted.

Further, a place in which the filtering apparatus is installed is a special environment such as a ship, so that the installation space (especially, the upper installation space) is not sufficiently large and is limited. As for the conventional filtering apparatus for treating ballast water, when it is required to separate the core c from the housing a to repair the apparatus, the driving shaft d and the core c which have been coupled to each other cannot be pulled out because of the limited upper space. Thus, the filtering apparatus is problematic in that the driving shaft d and the core c must be previously separated from each other, and thereafter both must be coupled to each other again.

In order to overcome the problem, according to the present invention, as shown in FIG. 11, a first corner 5114 of the projecting end 5116 of the driving shaft 511 (more accurately, the first driving shaft 511') is chamfered or rounded. Thus, even in the state in which the driving shaft 511 is coupled to the core 523 via the coupling means 540, the driving shaft 511 may be rotated about the coupling means 540 as necessary. Hence, even when the installation space of the filtering apparatus, especially the upper space is not sufficiently large, both the driving shaft 511 and the core 523 can be easily pulled out from the housing 10 without the driving shaft and the core having to be disassembled. That is, if both the driving shaft 511 and the core 523 are not pulled out when the driving shaft 511 is erected up because of the limited upper space, as shown in FIG. 12, the driving shaft 511 rotates about the coupling means 540 towards the chamfered or rounded first corner 5114, thus reducing the height of the driving shaft 511. In this case, both the driving shaft 511 and the core 523 can be pulled out of the housing 10 while the coupling of the driving shaft and the core is maintained. Afterwards, when the core 523 and the driving shaft 511 are coupled to the housing 10, an additional operation of coupling the core 523 with the driving shaft 511 again is not required, this being convenient to a worker.

Further, a second corner 5115 of the projecting end 5116 of the driving shaft 511 (more accurately, the first driving shaft 511'), that is, a corner which is opposite to the first corner 5114 is formed to have a right angle, as shown in FIG. 11, so that the second corner 5115 keeps the driving shaft in a vertical position while the driving shaft 511 coupled to the core 523 transmits power, and thus the vertical and rotary movements of the driving shaft 511 can be transmitted to the core 523 unchanged.

Further, the conventional filtering apparatus for treating ballast water is problematic in that the suction nozzle which sucks foreign substances from the filter cannot easily come into close contact with the inner surface of the filter, and the coupled portion between the suction nozzle and the suction rod is not sealed, so that ballast water which is not filtered by the filter may undesirably pass through the suction nozzle and be discharged through the exhaust unit to the outside, in the operation of washing away foreign substances from the filter.

Therefore, according to the present invention, as shown in FIG. 13, the suction nozzle 521 includes a filter contact part 5211, a guide part 5212, an elastic means 5213, and a support part 5214. The filter contact part 5211 is in contact with the filter 30 and has a hole 52111 which permits the inflow of foreign substances. The guide part 5212 is coupled to the filter contact part 5211 to guide foreign substances, fed through the hole 52111, to the suction rod 522. The elastic means 5213, for example, a spring provides an elastic force to permit the movement of the filter contact part 5211 and the guide part 5212. The support part 5214 is coupled to the suction-rod coupling part 5215 which is connected to the suction rod 522, thus supporting an end of the elastic means 5213. Coupled portions between the filter contact part 5211 and the guide part 5212, between the suction-rod coupling part 5215 and the support part 5214, and between the support part 5214 and the guide part 5212 include sealing means 5216, for example, O-rings, thus preventing non-filtered ballast water from flowing into the suction nozzle 521 and being discharged through the exhaust unit 530, when foreign substances are washed away from the inner surface of the filter.

That is, in the suction nozzle 521 according to the present invention, the elastic force of the additional elastic means 5213 continues to press the filter contact part 5211 and/or the guide part 5212, so that the filter contact part 5211 and/or the guide part 5212 can come into close contact with the inner surface of the filter 30, thus preventing non-filtered ballast water, which is present inside the filter 30, from flowing into the hole 52111 of the filter contact part 5211 during the washing operation. Here, the elastic means 5213 may be provided in such a way as to be exposed to the outside of the suction nozzle 521. Further, in order to prevent non-filtered ballast water, present inside the filter 30 where the suction nozzle 521 is located, from flowing into portions where the components of the suction nozzle 521 are joined, the sealing means 5216 are provided in the coupled portions between the filter contact part 5211 and the guide part 5212, between the suction-rod coupling part 5215 and the support part 5214, and between the support part 5214 and the guide part 5212, thus thoroughly preventing non-filtered ballast water from flowing into the suction nozzle 521 and from being discharged through the exhaust unit 530. Preferably, the sealing means 5216 comprises an O-ring.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A filtering apparatus for treating ballast water, comprising:
    a housing having an inlet and an outlet which permits inflow and outflow of the ballast water;
    a filter filtering the ballast water which flows in the housing; and
    an automatic washing unit washing away foreign substances adhering to the filter;
    wherein the automatic washing unit comprises:
    a driving unit driving the automatic washing unit in response to a signal of the control unit;
    a suction unit movably connected to the driving unit to suck the foreign substances adhering to the filter; and
    an exhaust unit exhausting the foreign substances sucked by the suction unit; and
    the housing is constructed so that a housing cover plate coupled to an end of a housing body is removably coupled to the exhaust unit, thus enabling easy assembly, disassembly and maintenance; and
    the exhaust unit comprises a base flange on an end thereof which is coupled to the housing cover plate, and the base flange comprises a projecting step which projects to be inserted into a core through hole formed in the housing cover plate, so that the exhaust unit is precisely and easily coupled to the housing cover plate using the core through hole formed in the housing cover plate.

2. A filtering apparatus for treating ballast water, comprising:
    a housing having an inlet and an outlet which permits inflow and outflow of the ballast water;
    a filter filtering the ballast water which flows in the housing; and
    an automatic washing unit washing away foreign substances adhering to the filter;
    wherein the automatic washing unit comprises:
    a driving unit driving the automatic washing unit in response to a signal of the control unit;

a suction unit movably connected to the driving unit to suck the foreign substances adhering to the filter; and an exhaust unit exhausting the foreign substances sucked by the suction unit; and the housing is constructed so that a housing cover plate coupled to an end of a housing body is removably coupled to the exhaust unit, thus enabling easy assembly, disassembly and maintenance;

wherein the suction unit comprises a suction rod equipped with a suction nozzle which sucks the foreign substances adhering to the filter, and a core connected to the suction rod to move the sucked foreign substances;

the driving unit comprises a driving shaft which is connected to the core, the driving shaft being operated by a power source to move the core; and the core comprises a shaft coupling unit which protrudes from an end thereof coupled to the driving shaft, so that the core is coupled at the shaft coupling unit to the driving shaft via coupling means.

3. The filtering apparatus according to claim 2, wherein the coupling means is a solid key, and is welded to the shaft coupling unit after coupling has been completed.

4. The filtering apparatus according to claim 2, wherein outer diameters of the coupling means and the shaft coupling unit are formed to be smaller than an outer diameter of the core, thus enabling easy assembly or disassembly of the exhaust unit or the housing cover plate.

5. The filtering apparatus according to claim 3, wherein the shaft coupling unit comprises a first connection hole, and the driving shaft comprises a second connection hole which is provided in a portion thereof coupled to the shaft coupling unit and is aligned with the first connection hole in a line, so that the coupling means is inserted into the first and second connection holes.

6. The filtering apparatus according to claim 5, wherein a first corner of the driving shaft in which the second connection hole is formed is chamfered or rounded, so that the driving shaft can rotate about the coupling means, and thus the driving shaft and the core can be easily pulled out of the housing even if there is a spatial limitation.

7. The filtering apparatus according to claim 6, wherein a second corner of the driving shaft in which the second connection hole is formed has a right angle, thus keeping the driving shaft coupled to the core in a vertical position, therefore allowing vertical and rotary movements of the driving shaft to be transmitted to the core unchanged.

8. The filtering apparatus according to claim 2, wherein the suction nozzle comprises:

a filter contact part making contact with the filter and having a hole to permit inflow of foreign substances;

a guide part coupled to the filter contact part and guiding the foreign substances, fed through the hole, to the suction rod;

elastic means providing an elastic force to permit movement of the filter contact part and the guide part; and a support part coupled to a suction-rod coupling part which is connected to the suction rod, and supporting an end of the elastic means, and sealing means is provided in each of coupled portions between the filter contact part and the guide part, between the suction-rod coupling part and the support part and between the support part and the guide part, thus preventing non-filtered foreign substances present inside the filter from flowing into the suction nozzle and being discharged through the exhaust unit.

9. The filtering apparatus according to claim 8, wherein the elastic means is provided outside the guide part in such a way as to be located between the filter contact part and the support part.

\* \* \* \* \*